United States Patent [19]

Smith et al.

[11] Patent Number: 4,674,687

[45] Date of Patent: Jun. 23, 1987

[54] SHOWERHEAD

[75] Inventors: David W. Smith, Fort Collins; Michael A. Cammack, Laporte, both of Colo.

[73] Assignee: Teledyne Industries, Inc., Fort Collins, Colo.

[21] Appl. No.: 764,137

[22] Filed: Aug. 9, 1985

[51] Int. Cl.[4] .......................... B05B 1/16; F16L 19/00

[52] U.S. Cl. .................................... 239/447; 239/449; 239/525; 239/587; 239/600; 285/61; 285/82; 285/263; 285/376

[58] Field of Search ................................ 239/436–442, 239/282, 283, 383, 588, 381, 600, 443–449, 525, 587; 285/330, 282, 61, 82, 263, 376, 377; 248/222.2, 222.3, 75

[56] References Cited

U.S. PATENT DOCUMENTS

| | | | |
|---|---|---|---|
| 1,724,161 | 8/1929 | Wuesthoff | 239/587 X |
| 2,935,265 | 5/1960 | Richter | 239/587 X |
| 3,037,799 | 6/1962 | Mulac | 285/282 |
| 3,104,827 | 9/1963 | Aghnides | 239/587 X |
| 3,768,735 | 10/1973 | Ward | 239/441 |
| 3,865,310 | 2/1975 | Elkins et al. | 239/588 |
| 3,967,783 | 7/1976 | Halsted et al. | 239/383 |
| 4,091,998 | 5/1978 | Peterson | 239/283 |
| 4,141,502 | 2/1979 | Grohe | 239/381 |
| 4,254,914 | 3/1981 | Shames et al. | 239/383 |
| 4,303,201 | 12/1981 | Elkins et al. | 239/383 |
| 4,527,745 | 7/1985 | Butterfield et al. | 239/600 |
| 4,561,593 | 12/1985 | Cammack et al. | 239/600 |
| 4,588,130 | 5/1986 | Trenary et al. | 239/381 |

*Primary Examiner*—Andres Kashnikow
*Assistant Examiner*—Mary Beth O. Jones
*Attorney, Agent, or Firm*—Hugh H. Drake

[57] ABSTRACT

A showerhead includes a housing which defines different sets of spray outlets and includes a mounting for the housing that defines a path of water flow from an inlet. Formed on the housing are circumferentially-spaced grooves and formed on the mounting are mating lugs. Lands disposed between successive ones of the grooves include a cam surface which elevates in continuation toward the entrance of a next groove and then terminates in a step leading toward the bottom of that next groove, as a result of which the assembly atop the lands and subsequent movement of the lugs over the cam surface lockingly drops the lugs into corresponding ones of the grooves. The mounting includes a handle through which water flows and which is removably received within arms of a bracket to which water is supplied and therefrom led into the handle. A channel within the body of the bracket accepts a shank projecting from a pivot ball which sealing seats within a nut that, in turn, is threaded onto a water-supply pipe. The inner end of the shank is locked into place by means of inner interengaging lugs and ears which cooperate with a retainer that inhibits their inadvertent or intentional disassembly.

9 Claims, 8 Drawing Figures

SHOWERHEAD

The present invention pertains to a showerhead. More particularly, it relates to a showerhead that cooperates with a mount which, in turn, is supported in storage by a bracket.

U.S. application Ser. No. 459,137, filed Jan. 19, 1983, now U.S. Pat. No. 4,561,593 granted Dec. 31, 1985, describes and claims a showerhead that selectively delivers two different spray patterns and yet which is much simpler of manufacture than earlier showerheads typified by other U.S. applications identified therein and also belonging to the same assignee as the present application. Such showerheads as described in those prior patents also have been marketed in a version which includes a handle connected to a source of water by a flexible hose that enables the user to direct the spray to different parts of his body. Such a hand-held showerhead has usually been associated with some type of bracket for removably accepting the showerhead when in storage, and examples of such brackets are shown in U.S. Pat. Nos. 3,865,310 and 4,303,201 also assigned to the common assignee herein.

At least most such prior showerheads have encountered a problem in that, over a period of time, and for whatever reason such as expansion and contraction of parts or change in characteristics thereof, interconnected parts may tend toward disconnection, with the possible development of undesired leakage of water around the outside of the showerhead assembly. In addition, difficulty has been encountered in connection with the fact that some users, and/or their children, become curious and attempt to take it apart in order to determine how it works. While the existance of such curiosity may be admirable, the result too often has been that the appliance is not correctly reassembled with all the parts aligned and seated in their necessary relationships. Hence, some such units thereafter do not properly seal the water passageways or otherwise fail to perform satisfactorily, resulting in the existance of appliances that, when viewed by others, do not seem to be a very satisfactory product.

The foregoing problem was recognized early by applicant, as a result of which the different parts of a number of various showerheads were so tightly threaded together that no one could disassemble them without drastically marring the product unless such person had special tools for that purpose. That is, it became necessary to so assemble such appliances that the curious could not destroy the integrity of the unit.

It is, therefore, a general object of the present invention to provide a new and improved showerhead which addresses such problems and resolves them, while yet retaining simplicity of design and fabrication.

Another object of the present invention is to provide a new and improved showerhead that incorporates desirable features of the aforesaid application Ser. No. 459,137 and yet which accomplishes that with the provision of additional safeguarding features.

A further object of the present invention is to incorporate a bracket, associated with the showerhead itself, which embodies the same protective considerations.

A showerhead embodied in accordance with the foregoing includes a housing that defines at least one and preferably two spray outlets and a water inlet. A mounting for the housing defines a path of water flow from that inlet. Formed on a side of one of the housing and the mounting are means facing the other and defining a plurality of circumferentially-spaced grooves. On the other of the housing and the mounting are circumferentially-spaced lugs insertable within the different grooves. Disposed between those grooves are a plurality of lands that include a cam surface which elevates in continuation toward the entrance of a next groove and then terminates in a step leading toward the bottom of that groove, so that the assembly of the lugs atop the lands and subsequent relative rotation causes the lugs to lockingly drop into corresponding ones of the grooves.

In accordance with another aspect, the mounting has a hollow handle which fits into a bracket arranged to removably accept that handle. A coupling on the bracket body connects to a water supply. A channel within the body leads toward an outlet and includes circumferentially-spaced lugs that project from the body into the channel. A nut is securable upon a water supply pipe and defines one part of a swivel joint. There is a shank which terminates at one end in the other part of that swivel joint and has its other end portion disposed through an inlet opening and into the channel. On the inner end of the shank are a plurality of circumferentially-spaced ears that seat behind respective different ones of those lugs. Once that is accomplished, a retainer has a plurality of feet and legs joined together and is seatable behind such ears as well as into gaps therebetween so as to lock the shank within the channel.

The features of the present invention which are believed to be patentable are set forth with particularity in the appended claims. The organization and manner of operation of the invention, together with further objects and advantages thereof, may best be understood with reference to the following description taken in connection with the following drawings, in the several figures of which like reference numerals identify like elements and in which:

Figure 1:
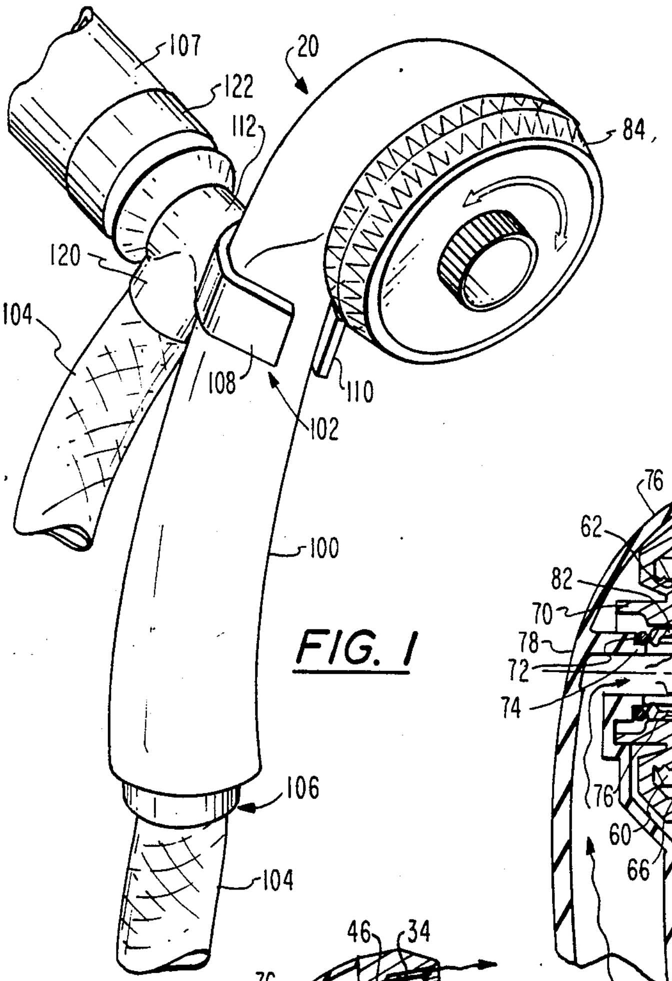
FIG. 1 is an isometric view of a showerhead mounted in a bracket and connected thereto by a fragmentarily-shown hose.
Figure 3:
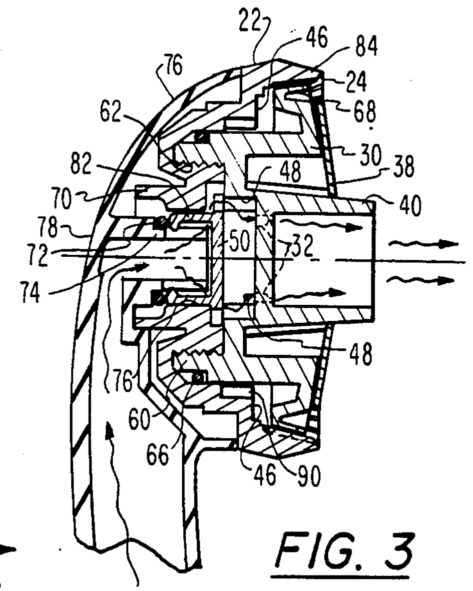
Figure 4:
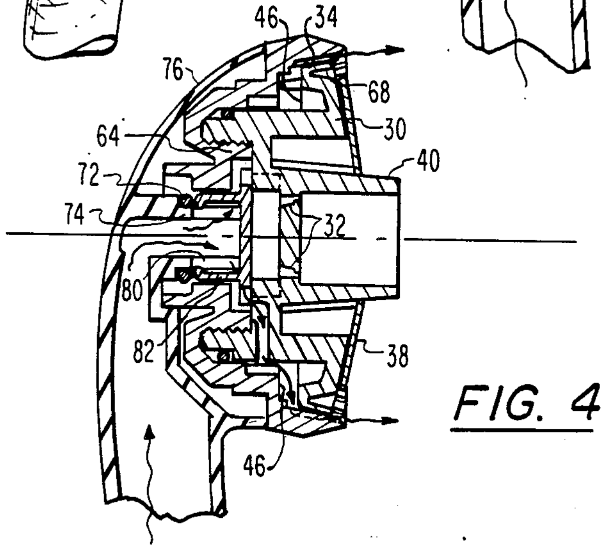
Figure 2:
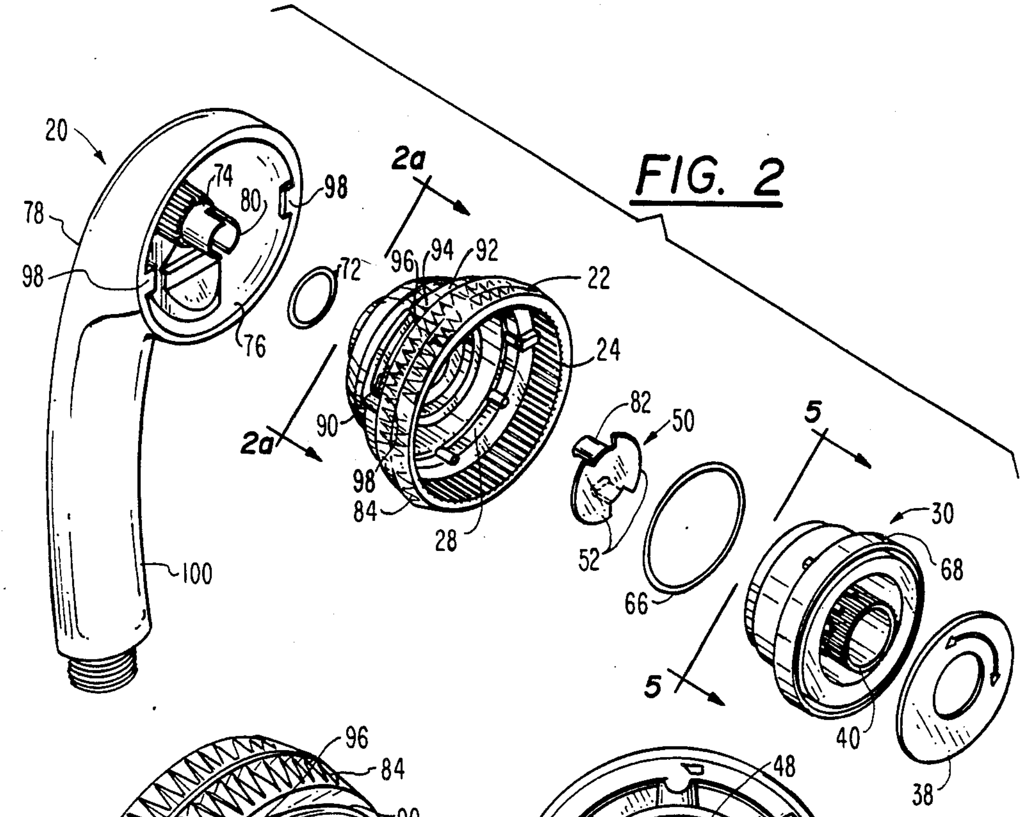
FIG. 2 is an exploded isometric view of the showerhead shown in FIG. 1.
Figure 2A:
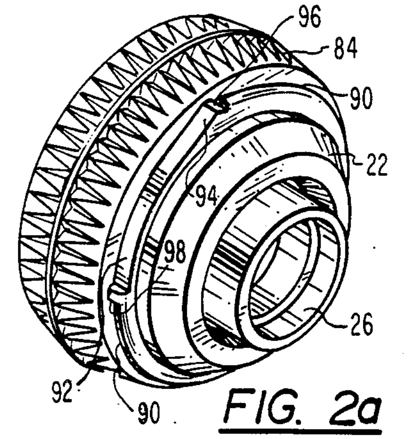
Figure 5:
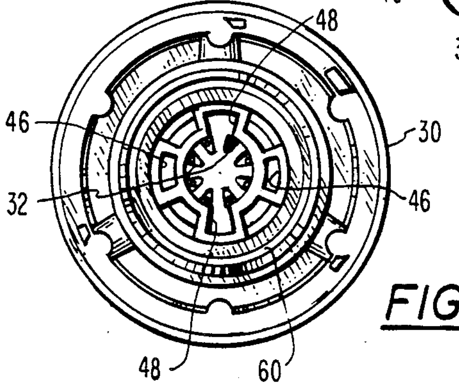
Figure 6:
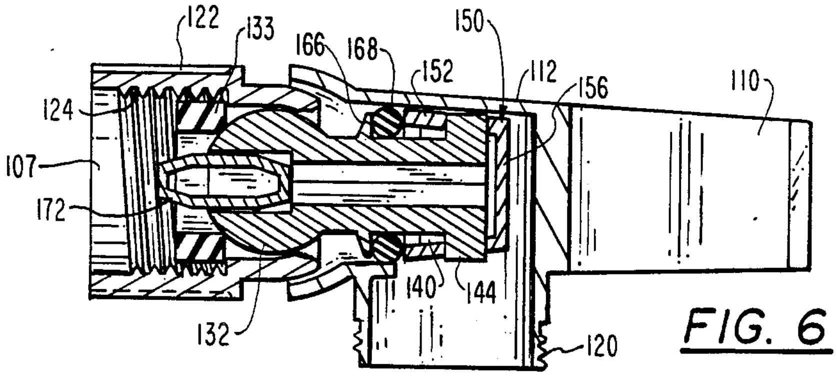

FIG. **2*a* is an isometric view taken from the rear of a component shown in FIG. 2**;

FIG. 3 is a fragmentary cross-sectional view taken longitudinally through the showerhead of FIG. 1;

FIG. 4 is a view similar to FIG. 3 but with certain components differently positioned;

FIG. 5 is rear elevational view of a component shown in FIG. 2 as taken along the line 5—5 in FIG. 2;

FIG. 6 is cross-sectional view of a sub-assembly shown in FIG. 1; and

Figure 7:
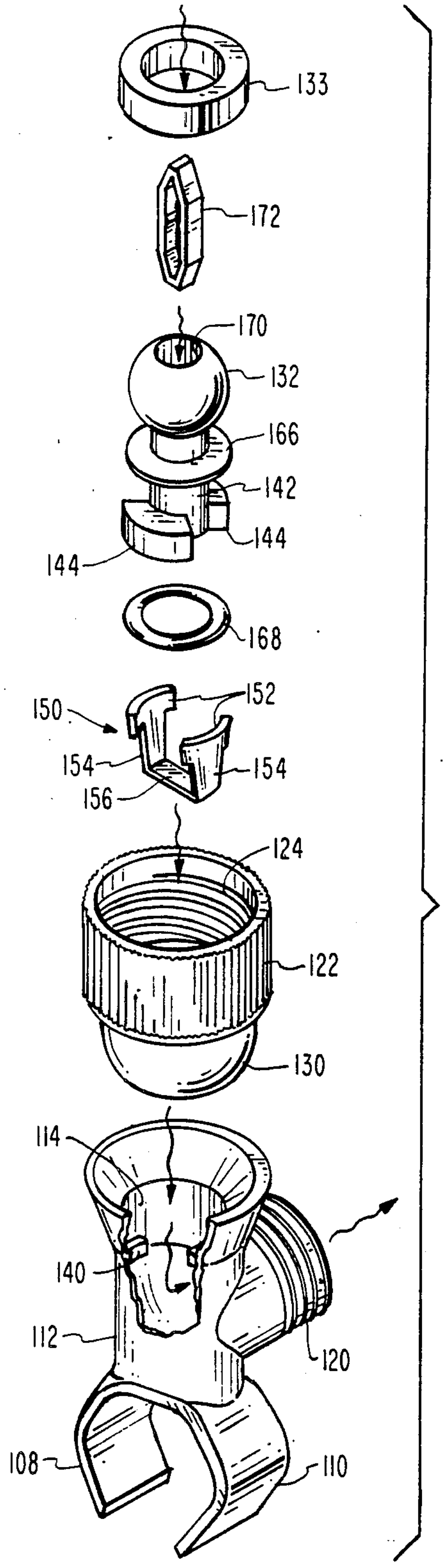

FIG. 7 is an exploded isometric view of the sub-assembly shown in FIG. 6.

A showerhead 20 includes a generally hollow housing 22 which has a front opening 24 and a rear opening 26 each of which lead to the interior 28 of housing 22. A closure 30 is affixed within front opening 24 and defines a first set of outlets 32 and a second set of outlets 34, each of which are formed to direct liquid in a selected spray pattern outwardly from interior 28. While the liquid sprayed is usually plain water, as received from a supply pipe, it has been suggested heretofore to include some kind of mixing device ahead of the showerhead so as selectively to add another material such as soap, oil or a medication. An indicia ring 38 encircles a snout 40 and covers the exposed front portion of closure 30.

Defined within closure 30 are a first pair of space-opposed channels 46 each of which leads outwardly from housing interior 28 for communication with outlets 34. Also formed in closure 30 are a second pair of space-opposed channels 48 oriented around a longitudinal axis of showerhead 20 at right angles to channels 46. Channels 48 lead to outlets 32. Disposed against closure 30 on the interior thereof is a flow director or plate 50 fixed in rotational position and which overlies the entrances to channels 46 and 48. Plate 50 includes space-opposed laterally-projecting wings 52 aligned to be selectively positionable to block communication of water with either channels 46 or 48 as housing 22 and closure 30 are rotated relative to plate 50.

Closure 30 includes a rearwardly-projecting cup 60 threaded internally at 62 to engage mating threads on a forwardly projecting flange 64 of housing 22. An O-ring 66 establishes a seal between closure 30 and housing 22.

Outlets 32 are spaced apart circumferentially in a ring. Outlets 34 are, in this case, formed by a series of grooves or slots spaced about the inner peripheral wall of opening 24 and preferably are of alternating angles and depths, so as to create a rather broad outer spray pattern composed of two concentric circular individual spray patterns. A rim 68 on closure 30 completes the definition of outlets 34.

Projecting from the rear of housing 22 is a tube 70 which embraces an internal O-ring 72 for sealing engagement against a boss 74 formed centrally in the facing central bottom of the semi-spherical shell 76 of a mounting 78. Projecting toward housing 22 are a pair of space-opposed lugs 80 sized to be receivable within tube 70 for interengagement with a corresponding pair of space-opposed prongs 82 that project from flow director 50 rearwardly into tube 70. That is, lugs 80 and prongs 82 are interlocked in terms of rotational movement.

On the peripheral exterior of housing 22 is a knurled ring 84 which may be grasped by the user in order to rotate the housing, along with closure 30, about the axis of tube 70. Since the interengagement of prongs 82 with lugs 80 spatially fixes flow director 50 in position, that action moves closure 30 relative to wings 52 so as selectively to determine whether incoming water communicates with channels 46 or 48.

Defined on the portion of housing 22 that faces mounting 78 are a pair of space-opposed grooves 90. Circumferentially disposed between corresponding ends of those grooves are lands 92. Each land, in continuing toward the beginning of a groove at one end, defines an upwardly-sloping cam surface 94 which terminates in an abrupt drop at 96 into the bottom of a respective one of grooves 90.

Inwardly projecting from the peripheral margin of shell 76 are a pair of space-opposed lugs 98 positioned normally to be receivable upon lands 92 when housing 22 is inserted into a position residing within shell 76. Thereafter, rotation of housing 22 relative to mounting 78 causes lugs 98 to be elevated by cam surfaces 94 and then drop into their respective grooves 90, at which time housing 22 becomes locked to mounting 78, seriously impeding and inhibiting subsequent disassembly of housing 22 from mounting 78.

While housing 22 is being engaged within shell 76, lugs 80 interfit with prongs 82, so that flow director 50 also becomes locked in spatial orientation relative both to housing 22 and mounting 78. Yet, housing 22, together with closure 30, which has been tightly torqued into place within housing 22, may be rotated so as selectively to adjust the relationship between channels 46 and 48 and wings 52 on flow director 50. Such rotation of the housing is limited in extent by the predetermined length of grooves 90 as shown. That is, the end of each groove 90 opposite the drop at 96 constitutes a stop 98. Within the range thereby established, the ultimately outletted spray changes between that delivered by outlets 32 and that delivered by outlets 34. An intermediate positioning enables the delivery of spray patterns from both of those sets of outlets. All such action, and the respective flow patterns, may be observed by comparing FIGS. 3 and 4.

From the exterior of shell 76 of mounting 78, a hollow handle 100, intended for grasping by the user's hand, projects in the direction of what usually is downwardly. As is known, as such, the affixation of such a handle enables the user to detach mounting 78 from a bracket 102 and then direct the spray, in accordance with his preferences, to different parts of his body. A flexible hose 104 is sealingly threaded by a standard coupling onto the remote end 106 and leads to another portion of bracket 102 which then connects to a water supply or a delivery pipe 107. The water delivered by hose 104 flows through the interior of handle 100 and exits between lugs 80 for entrance into the interior of housing 22 for selection by director plate 50.

For storage, handle 100 is slidingly receivable within space-opposed arms 108 and 110 which project beyond a hollow body 112 within which is a longitudinally-continuing channel 114. Arms 108 and 110 may be formed rigidly, so as only to permit handle 100 to be slipped within those arms. Those arms may be resilient so as to either allow that manner of seating or to permit handle 100 to be inserted through the free ends of those arms, or they may be of a more involved structure such as illustrated in aforesaid U.S. Pat. No. 3,865,310.

A threaded outlet coupling 120 projects laterally from the side wall of hollow body 112 for coupling to the appropriate end of hose 104. At the other end from bracket 102 is a nut 122 securable upon water supply pipe 107, and it also defines one part of a swivel joint to the interior of channel 114 in order to deliver water through hose 104 and, thence, ultimately into the interior of housing 22 for delivery in a spray pattern.

Nut 122 is internally threaded as at 124 to enable connection to water delivery pipe 107. Nut 122 also includes a snout 130 which envelopes a ball 132. The internal wall of snout 130 tapers inwardly to captivate ball 132 when the nut is screwed onto pipe 107 and, thus, moved outwardly from ball 132. A seal 133 not only functions to effect sealing as against leakage of the internally flowing water but also urges ball 132 outwardly relative to snout 130 when threads 124 are attached to the supply pipe.

Projecting from the side walls and into the interior of channel 114 are a pair of circumferentially-spaced lugs 140, oppositely disposed. A shank 142 terminates at one end at ball 132 and has its other end portion disposed through snout 130 and into channel 114, so as to reside in the vicinity of lugs 140. A space-opposed pair of ears 144 project laterally from shank 142 and, when shank 142 is inserted within channel 114, establish completion of a pivot joint. When shank 142 is then rotated relative to channel 114, individual ones of lugs 140 are seated behind ears 144.

A retainer 150 includes a pair of space-opposed feet 152 which individually are engagable with the respective sides of the corresponding ones of ears 144 that face the pivot joint. Projecting in a direction toward the other end of shank 142 are a pair of space-opposed legs 154 which are sized to be seated between corresponding different ones of ears 144. A bridge 156 joins together the ends of legs 154 remote from feet 152, with retainer 150 exhibiting sufficient resiliency to allow feet 152 to be moved over ears 144 and lodge adjacent to the sides of lugs 140 that face the pivot joint. Feet 152 are spaced to define gaps successively therebetween and, upon assembly of the unit. That is, the assembly is irreversable. The projection of lugs 140 into the gaps prohibits the disassembly of the unit.

The only thing which normally may be disengaged, without harming the unit, is the coupling of hose 104 to bracket 102 or the coupling of nut 122 onto the supply pipe. The tighter the adjustment of nut 122 upon that supply point, the greater the resistence to spatial movement of bracket 102 relative to the supply pipe. Seal 133 enables frictional adjustment of pivot joint 124 upon only a slight loosening of nut 122, and the seal normally allows availability of that adjustment while still prohibiting water leakage at nut 122.

Projecting laterally outward from shank 128 is a collar 166 disposed thereon toward the pivot joint in a position spaced from ears 144 sufficient to accomodate the disposition thereon of a resilient elastomeric seal 168 such as an O-ring. Of course, seal 168 seats within channel 114 as to maintain the integrity of the water flow path and prevent leakage.

Another feature desirably included is the disposition within a channel 170 through ball 132 of a flow restrictor 172. With restrictor 172 in place within ball 132, the delivery of water is at a rate of flow believed to satisfy all known governmental requirements pertaining to water conservation, and the other various water-conveyancing means within the device are sized to accomodate the delivery of a sufficiently satisfactory water spray at delivered water pressures of 40–60 psi which are somewhat typical of municipal water-supply systems.

However, some municipal systems operate at lower pressures, and many pressurized systems associated with the user's own well also operate at lower pressures. In such cases, the spray force may prove to be insufficient. Should that occur, the user need only uncouple nut 122, reach inside the nut and remove restrictor 172. As such, restrictor 172 forms no part of the subject matter claimed in this application, but a fuller explanation and alternatives as to the restrictor will be found in the aforesaid U.S. Pat. No. 4,561,593.

It will be observed that the adaptation of a showerhead patterned after that disclosed in the aforesaid U.S. Pat. No. 4,561,593 to a hand-held version has been accomplished with a minimum of additional parts and all of which may be of molded plastic. As compared with that cross-referenced application, the mounting for the same flow director is even simpler and the retention of the flow director is integrated in combination with a manner of mounting to a handle that assures against undesired disassembly. At the same time, all of the desired functions of bracket 102 are provided in what becomes an assembly of only four basic parts that are easy to assemble and yet tougher to disassemble while remaining intact.

It may be noted that, as specifically embodied, various different individual components are formed with space-opposed pairs of space-opposed elements. The use of such pairs appears to be preferable for simplification and the reduction in the cost of materials. Nevertheless, it is contemplated that, if desired, any such cooperating group of elements may be greater in number, such as, and just for example, the employment of three circumferentially-spaced feet 152 together with a corresponding increase in the number of legs, ears and so forth.

While a particular embodiment of the present invention has been shown and described, and various modifications and alternatives have been mentioned, it will be obvious to those skilled in the art that changes and modifications may be made without departing from the invention in its broader aspects. Therefore, the aim in the appended claims is to cover all such changes and modifications as fall within the true spirit and scope of that which is patentable.

We claim:

1. A showerhead comprising:

a housing defining at least one spray outlet and a water inlet;

a mounting for said housing which defines a path of water flow to said inlet;

means formed on a side of one said housing and said mounting that faces the other of said housing and said mounting and defines a plurality of circumferentially-spaced grooves;

means formed on a side of the other of said housing and said mounting that faces the one of said housing and said mounting and defining a plurality of circumferentially-spaced resilient lugs insertable within respective different ones of said grooves, each groove having a predetermined length and receivable of corresponding ones of said lugs for movement along the length of the corresponding groove, and a plurality of lands disposed in circumferential succession between successive corresponding ones of said grooves, each of said lands including a cam surface which elevates in continuation toward the entrance of the next groove and then terminates in a step leading toward the bottom of said next groove, whereby assembly of said lugs atop said lands and subsequent movement of said lugs over said cam surface abruptly drops said lugs lockingly into corresponding ones of said grooves and in inhibition of subsequent disassembly of said housing from said mounting.

2. A showerhead as defined in claim 1 in which the end of each of said grooves remote from the corresponding step includes a stop which prohibits further movement of said lugs relative to said grooves.

3. A showerhead as defined in claim 1 which includes a hollow handle depending from said mounting and connectable to a source of water to be conducted interiorally of said handle to said path.

4. A showerhead as defined in claim 1 in which a plurality of sets of spray outlets are defined in said housing, which includes a flow director for selecting the path of water flow to different ones of said sets of spray outlets, and which includes means for interconnecting said director and said mounting to permit movement of said housing relative to said mounting and said director for determining said path of water flow as between or among said sets.

5. A showerhead as defined in claim 4 in which at least a pair of prongs project from one toward the other of said director and said mounting and at least a pair of retainers project from the other to the one of said director and said mounting with said prongs being interlocked with said retainers.

6. For use with a showerhead from which projects a hand-held handle, a bracket comprising:
- a hollow body from which project means for removably accepting said handle for mounting thereon;
- an outlet coupling projecting from said body for connection of water flow to said showerhead;
- an inlet opening into a channel within the interior of said body and leading to said outlet;
- a plurality of circumferentially-spaced lugs projecting from said body into said channel;
- a nut securable upon a water supply pipe and having one part of a swivel joint facing said body;
- a shank terminating at one end in the other part of said swivel joint and having its other end portion disposed through said inlet opening and into said channel;
- a plurality of circumferentially-spaced ears projecting laterally from said other portion of said shank and, when said shank is inserted within said channel, to effect completion of said pivot joint and then rotated relative to said channel, individually seated behind respective different ones of said lugs;
- and a retainer having a plurality of circumferentially-spaced feet individually engageable with the respective sides of the corresponding different ones of said ears which face said pivot joint, a plurality of circumferentially-spaced legs projecting from respective different ones of said feet in the direction of said other end of said shank and sized to be seated between corresponding different ones of said ears and means joining together the ends of said legs remote from said feet with said retainer exhibiting sufficient resiliency to allow said feet to be moved over said ears and lodge adjacent to said sides and with successive ones of said feet defining gaps therebetween into which said lugs project.

7. A bracket as defined in claim 6 which further includes a collar encircling said shank in a location spaced from said ears toward said pivot joint a distance sufficient to accept an elastomeric ring for sealing said shank with said channel.

8. For use with a showerhead from which projects a hand-held handle, a bracket comprising:
- a hollow body from which project means for removably accepting said handle for mounting thereon;
- an outlet coupling projecting from said body for connection of water flow to said showerhead;
- an inlet opening into a water flow channel within the interior of said body and leading to said outlet;
- a plurality of circumferentially-spaced lugs projecting from said body into said channel;
- a nut securable upon a water supply pipe and having one part of a swivel joint facing said body;
- a shank terminating at one end in the other part of said swivel joint and having its other end portion disposed through said inlet opening and into said channel;
- and means disposed within said channel and interengagable with said lugs and shank for irreversably locking said shank within said channel upon being assembled together.

9. A showerhead comprising:
- a housing defining at least one spray outlet and a water inlet;
- a mounting for said housing which defines a path of water flow to said inlet;
- means formed on a side of one of said housing and said mounting that faces the other of said housing and said mounting and defines a plurality of circumferentially-spaced grooves;
- means formed on a side of the other of said housing and said mounting that faces the one of said housing and said mounting and defining a plurality of circumferentially-spaced resilient lugs insertable within respective different ones of grooves, each groove having a predetermined length and receivable of corresponding ones of said lugs for movement along the length of the corresponding groove and a plurality of lands receivable of corresponding ones of said lugs and disposed in circumferential succession between successive corresponding ones of said grooves, each of said lands including a cam surface which elevates in continuation toward the entrance of the next groove and then terminates in a step leading toward the bottom of said next groove, whereby assembly of said lugs atop said lands and subsequent movement of said lugs over said cam surface abruptly drops said lugs lockingly into corresponding ones of said grooves and in inhibition of subsequent disassembly of said housing from said mounting;
- a hollow handle depending from said mounting and connectable to a source of water to be conducted interiorally of said handle to said path;
- a hollow body from which project means for removably accepting said handle for mounting thereon;
- an outlet coupling projecting from said body for connection of water flow to said showerhead;
- an inlet opening into a water flow channel within the interior of said body and leading to said outlet;
- a plurality of circumferentially-spaced lugs projecting from said body into said channel;
- a nut securable upon a water supply pipe and having one part of a swivel joint facing said body;
- a shank terminating at one end in the other part of said swivel joint and having its other end portion disposed through said inlet opening and into said channel;
- and means disposed within said channel and interengagable with said lugs and shank for irreversably locking said shank within said channel upon being assembled together.

* * * * *

UNITED STATES PATENT AND TRADEMARK OFFICE

CERTIFICATE OF CORRECTION

PATENT NO. : 4,674,687

DATED : June 23, 1987

INVENTOR(S) : David W. Smith and Michael A. Cammack

It is certified that error appears in the above-indentified patent and that said Letters Patent is hereby corrected as shown below:

Column 7, line 26, the comma (,) should be deleted.

Signed and Sealed this

Twenty-eighth Day of December, 1993

Attest:

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 4,674,687

DATED : June 23, 1987

INVENTOR(S) : David W. Smith, et al

It is certified that error appears in the above-indentified patent and that said Letters Patent is hereby corrected as shown below:

Column 5, lines 11 through 15, inclusive, should read: -- of lugs 140 that face the pivot joint. Feet 152 are spaced to define gaps successively therebetween and, upon assemby of the unit, the projection of lugs 140 into the gaps prohibits the disassembly of the unit. That is, the assembly is irreversible. --.

Signed and Sealed this

First Day of March, 1994

Attest:

Bruce Lehman

BRUCE LEHMAN

Attesting Officer

Commissioner of Patents and Trademarks